March 24, 1931.   J. G. EVERSTAM   1,797,407
HYDRAULIC CLUTCH AND TRANSMISSION DEVICE
Filed April 8, 1929   4 Sheets-Sheet 1

Inventor:
Johan Gunnar Everstam
by George Bayard Jones
Attorney.

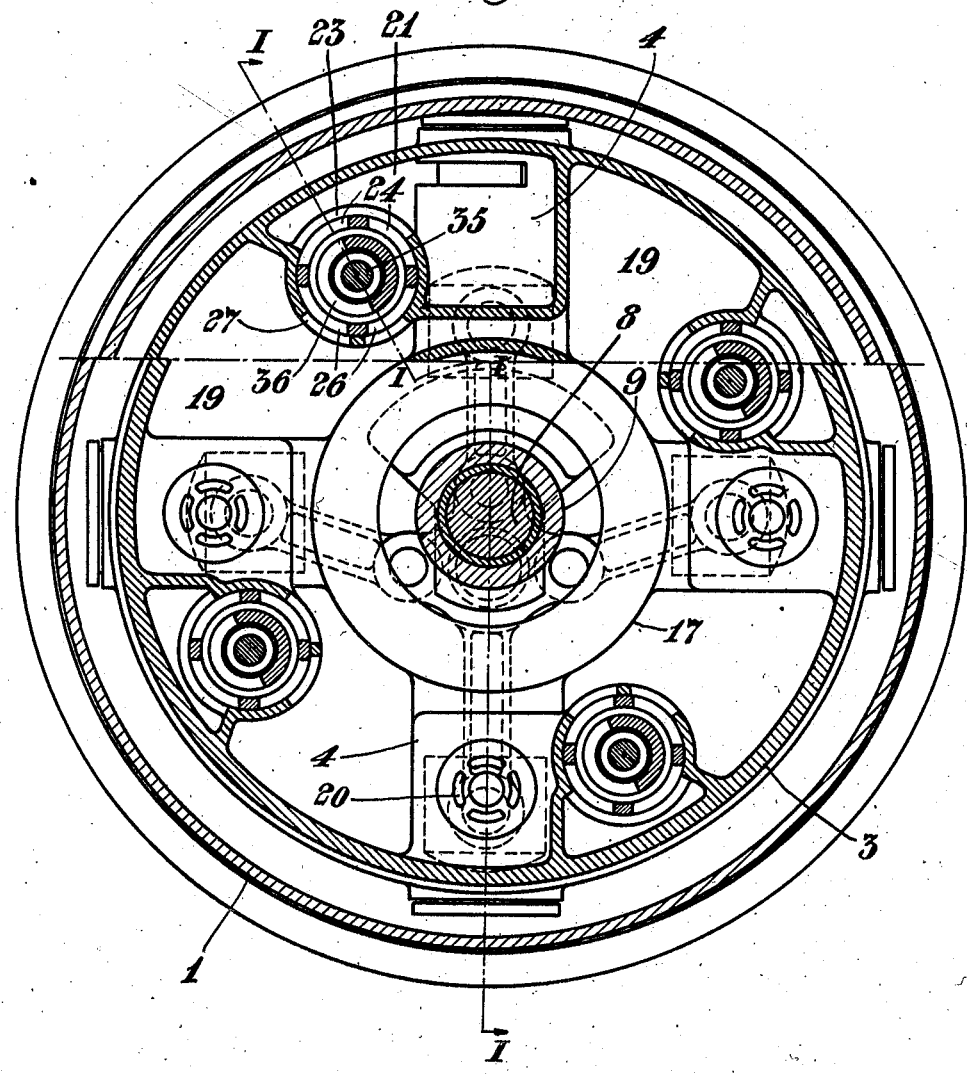

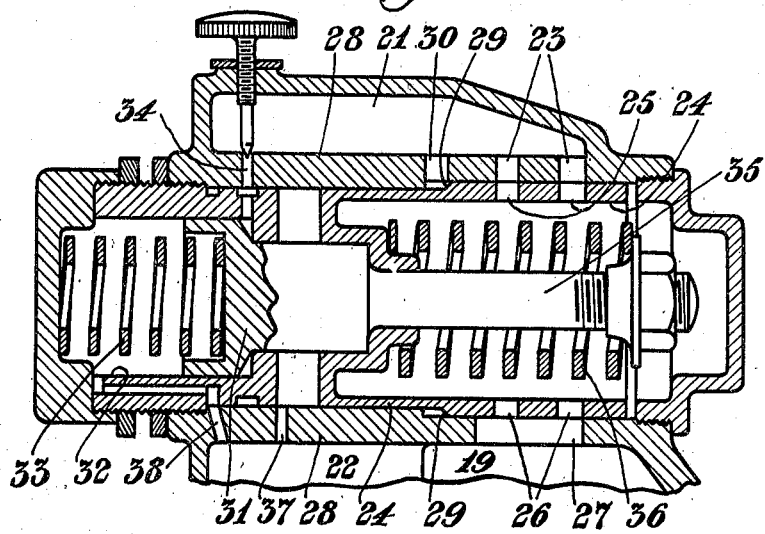
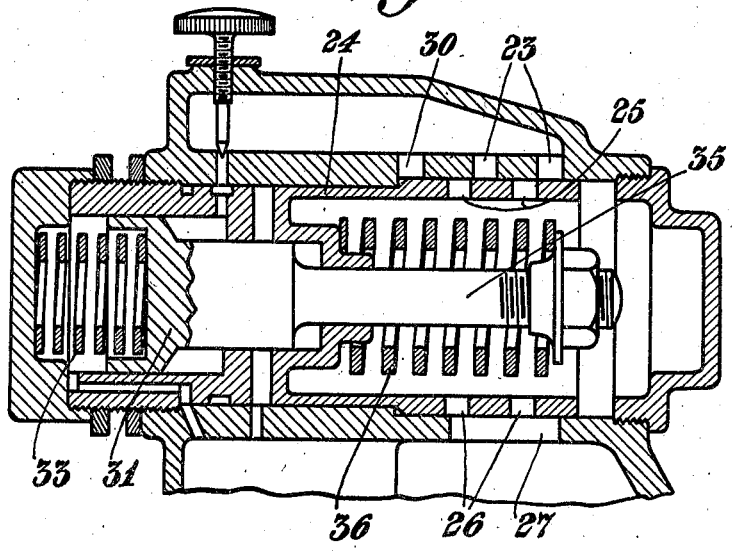

March 24, 1931.  J. G. EVERSTAM  1,797,407

HYDRAULIC CLUTCH AND TRANSMISSION DEVICE

Filed April 8, 1929  4 Sheets-Sheet 4

Inventor:
Johan Gunnar Everstam
by
Attorney.

Patented Mar. 24, 1931

1,797,407

UNITED STATES PATENT OFFICE

JOHAN GUNNAR EVERSTAM, OF SUNDSVALL, SWEDEN

HYDRAULIC CLUTCH AND TRANSMISSION DEVICE

Application filed April 8, 1929, Serial No. 353,489, and in Sweden April 7, 1928.

The present invention relates to a hydraulic clutch and transmission device of the type which is provided with two mutually rotatable clutch members or rotors which together form a pump for a liquid which serves as a clutch or transmission medium, and which is provided with a valve device for regulating and controlling the flow of the liquid from the pressure chamber of such pump. The purpose of the invention is to provide a clutch and transmission device of this type which shall operate fully automatically at different outputs of the driving motor or engine and at different loads.

The invention consists principally in that the valve device consists of a slide valve which is connected by the intermediary of a spring to a piston which is actuated by the pressure of the liquid in the pressure chamber of the pump and is spring-actuated in opposition to such pressure in such manner that by displacement of said piston under the influence of such pressure of the liquid, the slide valve is displaced to a position in which it closes the outflow opening from said pressure chamber, the slide valve being provided with a pressure surface subjected to the pressure of the liquid in said pressure chamber, so that upon further increase of the pressure in the pressure chamber the slide valve will be moved back, while compressing the spring connecting the same with the piston, to such position that the outflow opening is again opened.

Figure 1:
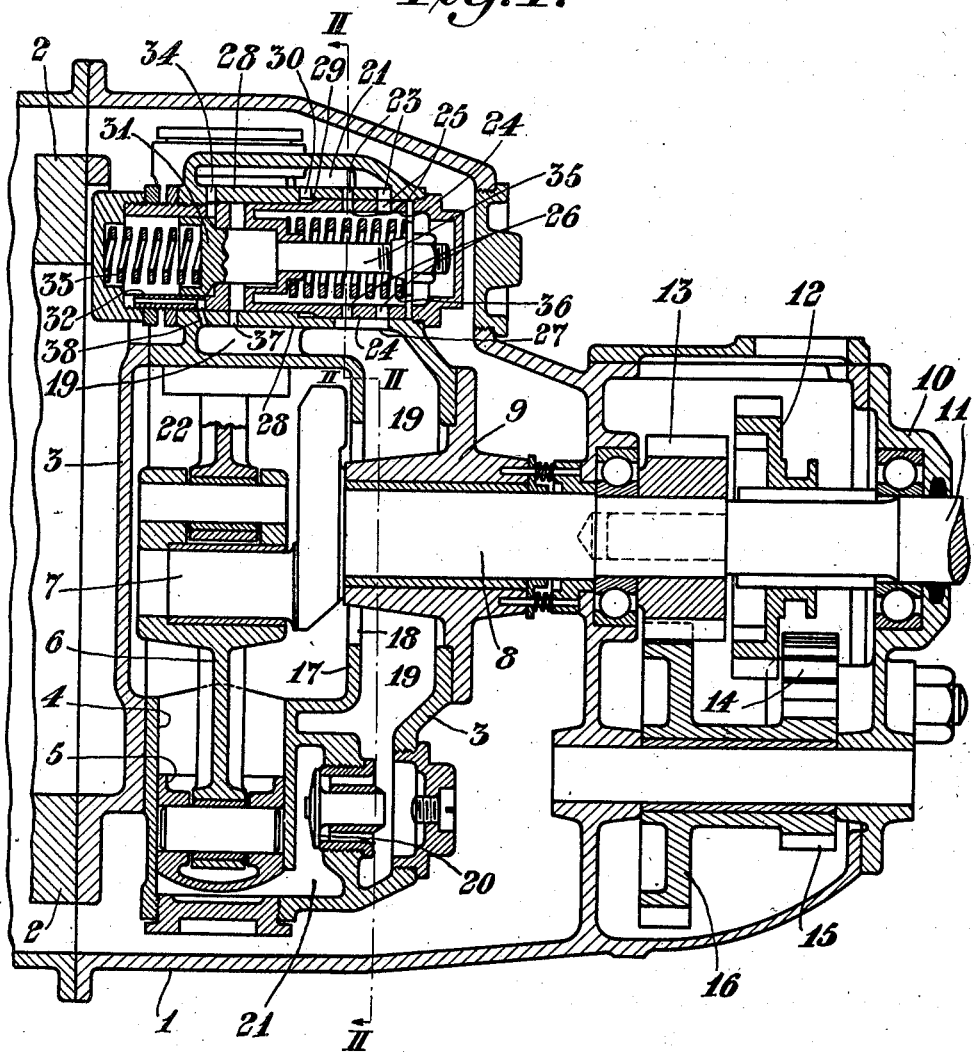

In the accompanying drawings an embodiment of a hydraulic clutch and transmission device according to the invention is illustrated by way of example. Fig. 1 shows the device in axial section on the line I—I—I—I in Fig. 2, and Fig. 2 shows a cross section on the line II—II—II—II in Fig. 1. Figs. 3, 4, 5, and 6, show the valve device in four different working positions.

The device illustrated in the drawing is intended for a motor car. Within a stationary casing 1 which may suitably be secured to or connected with the motor casing, a second casing 3 is secured to the engine fly-wheel 2, said casing 3 thus rotating with the fly-wheel. Said casing 3 constitutes the one clutch member or the one rotor. In said casing 3 there is a number of cylinders 4, four in number in the instance illustrated, which are located radially from the axis of rotation of the casing 3. In these cylinders 4 there are pistons 5 which are connected by means of connecting rods 6 to a crank pin 7 on a shaft 8 which is coaxial with the axis of rotation of the engine and casing 3, and which is journalled in the outer casing 1. Said shaft 8 also passes through a bearing 9 in the rotating casing 3. The shaft 8 constitutes the second clutch member, or the second rotor, from which the power is thus to be transmitted, in this case to the driving wheels of the car. For this purpose, Fig. 1 shows to the right of the casing 1 a gear box 10 into which the shaft 8 projects as driving shaft. The driven shaft 11 is as usual in alignment with the driving shaft 8, and may be connected in any suitable manner to the cardan or drive shaft of the car.

A gear wheel 12 is slidable on the shaft 11, so that when moved to the left in Fig. 1, it engages the gear wheel 13 secured to the shaft 8 in the usual manner and thus effects direct coupling between the shafts 8 and 11. In the position of the gear wheel 12 illustrated in the drawing said shafts are disconnected from each other. If the gear wheel 12 is displaced to the right in Fig. 1, it will mesh with the gear wheel 14, which meshes with a gear wheel 15, which latter is connected with the gear wheel 16, which in its turn meshes with the gear wheel 13. In the last-mentioned position of the gear wheel 12 the shaft 11 will thus be given a direction of rotation opposite to that of the shaft 8 for backing the car.

The space within the rotary casing 3 is filled to the greater part with a liquid, for instance oil. Said space is divided into two chambers by means of a partition 17, which is provided with a central opening 18. From the right-hand chamber 19 in Fig. 1 the liquid may flow through the inlet valves 20 into the pressure chambers 21 which are in communication with the cylinders. In the left-hand chamber 22 in Fig. 1 are the crank pin 7 and parts associated therewith.

Assuming that the car is standing still and is to be started ahead, the gear 12 is moved to the left into engagement with the gear 13, so that the shafts 8 and 11 become directly coupled, and the shaft 8 will thus at first be at rest.

Now, when the engine revolves, the casing 3 will be entrained in the rotation of the flywheel 2, and since thus the cylinders 4 in the casing 3 rotate about the initially stationary crank pin 7, the pistons 5 will be moved in and out in the cylinders. When a piston 5 moves inwards towards the axis of rotation the suction valve 20 opens and a quantity of liquid is drawn from the chamber 19 into the pressure chamber 21 and into the cylinder. When afterwards the piston moves outwards from the axis of rotation, the suction valve 20 closes and the liquid in the cylinder and in the pressure chamber is put under pressure. Through a greater or less discharge of liquid from the pressure chamber a smaller or higher degree of connection or coupling shall be produced between the two clutch members or rotors.

For this purpose the pressure chamber 21 communicates with the chamber 19 through pressure ports 23 which are controlled by a valve device. This device, which is shown to a larger scale in Figs. 3 to 6 inclusive, consists of a slide valve 24 which, in the instance illustrated, is hollow, for instance cylindrical, and which has ports 25 in one wall which communicate with the ports 23, and in its opposite wall has ports 26 which communicate with a larger port 27 in the valve chamber 28 leading to the chamber 19. The slide valve 24 has an external shoulder or pressure surface 29 which, through a port 30 in the valve chamber, is in communication with the pressure chamber 21.

A piston 31 which is coaxial with the slide valve 24, is movable in a cylinder 32 and is actuated on one side by a spring 33 provided in said cylinder, and on the opposite side by the pressure in the pressure chamber 21 through a passage 34 which connects said pressure chamber with the cylinder 32 on said side of the piston 31. A rod 35 projecting from the piston 31 passes through the bottom of the slide valve 24 and is surrounded by a spring 36, which is inserted between the slide valve 24 and a nut on the rod 35. The space to the left of the slide valve 24 in the valve chamber 28 communicates through a passage 37 with the chamber 19 in the casing 3, the purpose of said passage 37 being to admit liquid from the chamber 19 to said space to the left of the slide valve 24 so as to equalize the influence of the centrifugal force set up during rotation, of the liquid in the collecting chamber 19 on opposite sides of the slide valve 24. The chamber 19 also communicates through a passage 38 with the space to the left of the piston 31 in the cylinder 32.

In Fig. 1 and in Fig. 3 the slide valve 24 and the piston 31 are shown as occupying their initial positions. When starting, and when the driven rotor i. e. the shaft 8 is at rest, a pressure is set up in the pressure chamber 21, as above stated, said pressure forcing the liquid through the ports 23, 25, 26, and 27, from the pressure chamber 21 into the chamber 19 in the casing 3, from which chamber the liquid is again drawn into the pressure chamber 21. When the engine runs at ordinary starting speed, that is to say with a comparatively low number of revolutions per minute, the pressure in the pressure chamber 21 is insufficient to overcome the tension of the spring 33 and to move the piston 31.

When increasing the number of revolutions per minute of the engine, however, the pressure in the pressure chamber 21 increases and thus also the pressure of the liquid on the right-hand side of the piston 31. Said piston therefore begins to move to the left, carrying along the slide valve 24 to the left by the intermediary of the spring 36, so that the outflow ports 23 from the pressure chamber 21 become partly throttled. To this displacement of the slide valve 24 to the left also contributes the fact that owing to the ports 26 not allowing the liquid in the interior of the slide valve 24 a quite unobstructed passage to the chamber 19, a pressure is set up by the liquid in the interior of the slide valve which thus constitutes a secondary pressure chamber.

Through the throttling of the ports 23, as above described, the pressure in the pressure chamber 21 is of course increased, with the result that the pressure on the pistons 5 is increased, so that the crank 7 and shaft 8 are gradually caused to begin to rotate, whereby the car is started, and also that the piston 31 is displaced further towards the left for throttling the outflow ports still more. The slide valve 24 does not fully follow the movement of the piston 31, however, since the pressure on the shoulder or pressure surface 29 counteracts such movement to the left, and also since owing to the throttling of the ports 23 the pressure in the secondary pressure chamber in the interior of the slide valve is decreased, and therefore, the piston 31 moves somewhat farther to the left than the slide valve 24, and the spring 36 will thus be compressed.

Figure 5:
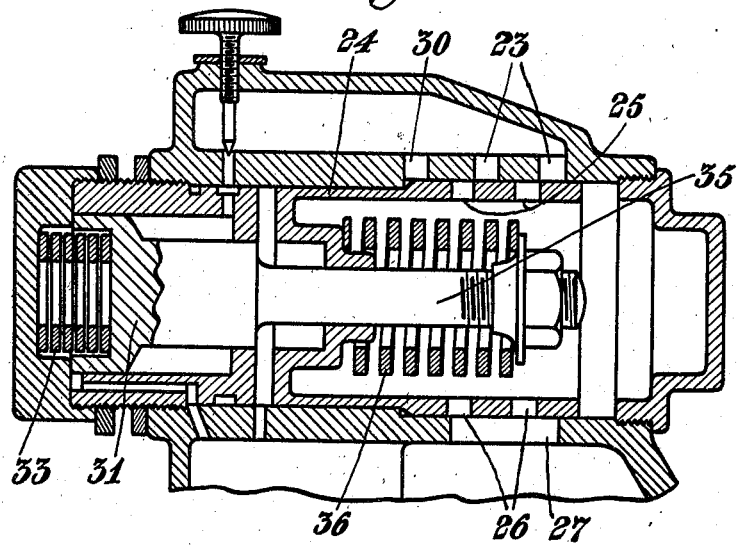
Figure 6:
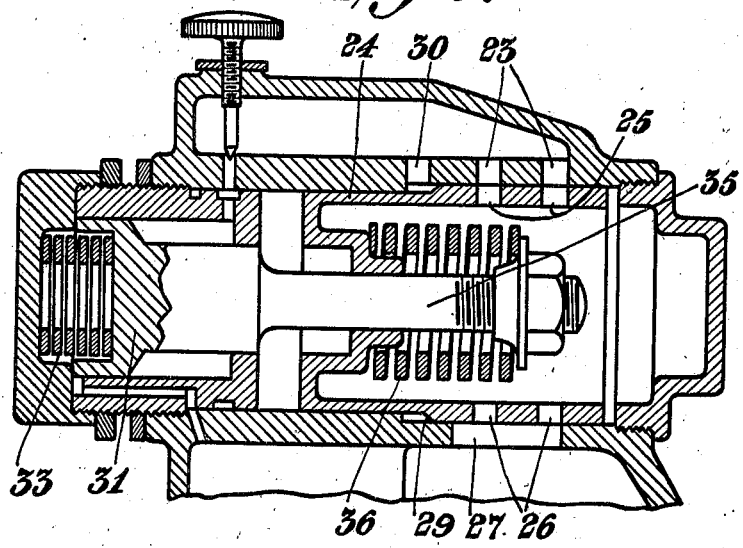

When the engine has been gradually run up to a higher number of revolutions per minute, however, and at the same time the car has been put in motion in the manner above described, the pressure in the pressure chamber 21 has finally been increased to such extent that while compressing the spring 36 the piston 31 has moved the slide valve 24 so far towards the left that the ports 23 are completely closed, so that the liquid is enclosed between the piston and the cylinder and pressure chamber, and thus the driving rotor and the driven rotor are directly coupled. This position is illustrated in Fig. 4 in which the shoulder 29 on the slide valve 24 has come to bear against a corresponding shoulder in the valve chamber 28. The car now runs on direct coupling or "high gear". As the number of revolutions per minute of the engine is further increased, the pressure in the pressure chamber 21 is of course also increased and, consequently, also the pressure on the right-hand side of the piston 31, which is therefore displaced to the left until it reaches the bottom of its cylinder, as shown in Fig. 5. This is the position bordering on what may be termed gear changing while in motion.

If a further increase of the pressure in the pressure chamber 21 arises, for instance owing to the car offering an increased resistance, such pressure will ultimately reach such a value that the ensuing pressure on the surface 29, to which the liquid in the pressure chamber 21 has access also in the position shown in Fig. 5, overcomes the tension of the spring 36, whereby the slide valve 24 is returned to the right so that the ports 23 again begin to open.

A quantity of liquid will thus be allowed to flow out from the pressure chamber 21, so that the pistons 5 can begin to move in the cylinders 4, and consequently, the driven rotor, i. e. the shaft 8, begins to rotate more slowly than the driving rotor, i. e. the casing 3 with the cylinders 4. It will be understood that the ports 23 will not be opened more than what is necessary in order to effect a certain circulation of the liquid, since as soon as the pressure decreases slightly in the pressure chamber 21, the pressure on the surface 29 also decreases, so that the spring 36 begins to move the slide valve 24 to the left, and to this result also contributes in this case that pressure of the liquid in the secondary pressure chamber within the slide valve 24 which arises as soon as the ports 23 are opened. As soon as the resistance of the car again decreases, so that the pressure in the pressure chamber 21 decreases, the slide valve 24 returns from the position illustrated in Fig. 6 to that shown in Fig. 5, and the device then again operates on direct coupling or "high gear." It will be obvious that the pressure surface 29 must be smaller than the pressure surface on the piston 31, so that said piston will remain in the position shown in Figs. 5 and 6 during the operation last described of the valve device.

If the number of revolutions per minute of the motor is decreased, the pressure in the pressure chamber 21 will, of course, also be decreased, and the device then returns first to the position shown in Fig. 4, and afterwards to the position shown in Fig. 3, which is the disconnected or inoperative position at low engine speed.

It is easily understood that when braking with the engine while the car is running, the valve device will operate in the same manner as above described, the shaft 8 then being the driving clutch member which will drive the pump pistons to and fro in the pump cylinders, and thus rapidly produce such pressure in the pressure chamber that direct coupling is obtained, and thus the engine is driven.

I claim:

1. In a hydraulic clutch and transmission device, the combination of two mutually rotatable rotors which together form a pump for a liquid which serves as a clutch or transmission medium, a pressure chamber for said pump having an outflow port, a valve device for controlling the flow of liquid from said pressure chamber through said outflow port, said valve device consisting of a slide valve, a piston actuated by the pressure in said pressure chamber and spring-actuated in opposition to such pressure, a spring connecting said slide valve and said piston, said piston being adapted when influenced by pressure in said pressure chamber to move said slide valve to such position as to close said outflow port from said pressure chamber, and said slide valve having a pressure surface subjected to the pressure in said pressure chamber in such direction as upon further increase of the pressure in said pressure chamber to return said slide valve against the action of said spring to such position as again to open said outflow port.

2. In a hydraulic clutch and transmission device, the combination of two mutually rotatable rotors which together form a pump for a liquid which serves as a clutch or transmission medium, a pressure chamber for said pump having an outflow port, a valve device for controlling the flow of liquid from said pressure chamber through said outflow port, said valve device consisting of a slide valve, a piston actuated by the pressure in said pressure chamber and spring-actuated in opposition to such pressure, a spring connecting said slide valve and said piston, said piston being adapted when influenced by pressure in said pressure chamber to move said slide valve to such position as to close said outflow port from said pressure chamber, said slide valve having a pressure surface subjected to the pressure in said pressure chamber in such direction as upon further increase of the pressure in said pressure chamber to return said slide valve against the action of said spring to such position as again to open said outflow port, a secondary pressure chamber connected to said slide valve in such manner that said slide valve is actuated by the pressure in said secondary pressure chamber in the same direction as said slide valve is actuated by said piston through the intermediary of said spring, and at least one port connecting said secondary pressure chamber to said first-named pressure chamber, said slide valve being adapted to control said port in such manner as to throttle said port upon movement of said slide valve caused by said piston.

3. In a hydraulic clutch and transmission device, the combination of two mutually rotatable rotors which together form a pump for a liquid which serves as a clutch or transmission medium, a pressure chamber for said pump having an outflow port, a valve device for controlling the flow of liquid from said pressure chamber through said outflow port, said valve device consisting of a slide valve, a piston actuated by the pressure in said pressure chamber and spring-actuated in opposition to such pressure, a spring connecting said slide valve and said piston, said piston being adapted when influenced by pressure in said pressure chamber to move said slide valve to such position as to close said outflow port from said pressure chamber, said slide valve having a pressure surface subjected to the pressure in said pressure chamber in such direction as upon further increase of the pressure in said pressure chamber to return said slide valve against the action of said spring to such position as again to open said outflow port, said slide valve consisting of a cylindrical hollow slide, the interior of said slide forming a secondary pressure chamber, a valve chamber in which said slide is slidable, said valve chamber communicating through said outflow port with said first-named pressure chamber, and having at least one outlet port of larger area than said outflow port, said slide having ports adapted to cooperate with said ports in said valve chamber, said slide valve being actuated by the pressure in said secondary pressure chamber in the same direction as said slide valve is actuated by said piston through the intermediary of said spring, and said slide being adapted to control said outflow port leading to the first named pressure chamber in such manner as to throttle said port upon movement of said slide valve caused by said piston.

4. A hydraulic clutch and transmission device as claimed in claim 3, in which the outlet port leads to a collecting chamber for liquid, and in which a passage connects said collecting chamber with a space in the valve chamber on the side of the slide valve opposite to the secondary pressure chamber, for the purpose of equalizing the influence of the centrifugal force of the liquid in the collecting chamber on both sides of the slide valve.

5. A hydraulic clutch and transmission device as claimed in claim 1, in which the piston is coaxial with the slide valve, and in which a spring actuating said piston is under tension in the initial position of the piston.

6. A hydraulic clutch and transmission device as claimed in claim 1, in which the spring connecting the piston with the slide valve is adjustable.

JOHAN GUNNAR EVERSTAM.